United States Patent [19]

Osbond et al.

[11] 3,857,872

[45] Dec. 31, 1974

[54] CYCLOPROPANE CARBOXYLIC ACID ESTERS

[75] Inventors: John Mervyn Osbond, Hatfield; James Charles Wickens, St. Albans, both of England

[73] Assignee: Hoffmann-La Roche, Inc., Nutley, N.J.

[22] Filed: May 4, 1971

[21] Appl. No.: 140,276

[30] Foreign Application Priority Data
June 8, 1970 Great Britain.................. 27583/70

[52] U.S. Cl............................. 260/468 H, 424/306
[51] Int. Cl............................................ C07c 69/74
[58] Field of Search....................... 260/468 H, 514

[56] References Cited
UNITED STATES PATENTS
3,285,950  11/1966  Weber ............................... 260/468
3,636,059  1/1972  Matsui et al. ..................... 260/347.4

FOREIGN PATENTS OR APPLICATIONS
1,961,776  6/1970  Germany ........................... 260/468

*Primary Examiner*—Robert Gerstl
*Attorney, Agent, or Firm*—Samuel L. Welt; Jon S. Saxe; William H. Epstein

[57] ABSTRACT

Cyclopropane carboxylic acid esters of hex-2,5-dienyl alcohol and of 2-yn-5-enyl and 2,5-dienyl aliphatic alcohols wherein the aliphatic chain contains between 6 and 12 carbon atoms. The esters are useful as insecticides.

7 Claims, No Drawings

CYCLOPROPANE CARBOXYLIC ACID ESTERS

SUMMARY OF THE INVENTION

In accordance with this invention, it has been found that esters of the formula:

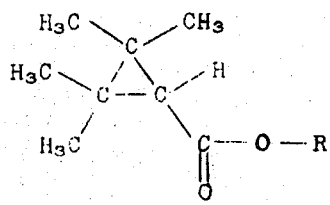   I wherein R is a group of the formula:

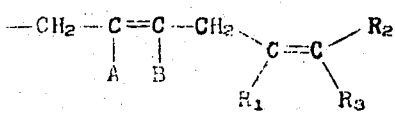   a or $$-CH_2-C \equiv C-CH_2-C \equiv CH$$   b;

$R_1$, $R_2$, and $R_3$ are hydrogen or lower alkyl; and A and B individually are hydrogen or A and B taken together form a carbon to carbon bond; are useful as insecticides.

The compounds of formula I are prepared by reacting an acid halide of the formula:

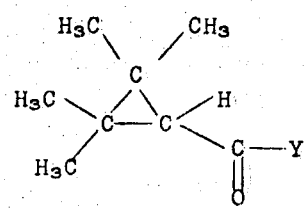   II wherein Y is chlorine or bromine; with an alcohol of the formula:

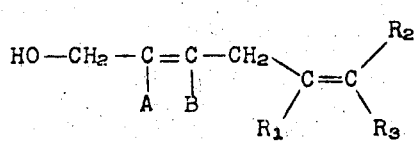   IIIa or $$HO-CH_2-C \equiv C-CH_2-C \equiv CH$$   IIIb wherein $R_1$, $R_2$, $R_3$, A and B are as above.

The compounds of formula I are also prepared by reacting a salt of the formula:

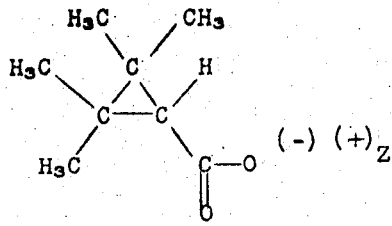   IV wherein Z is an alkali metal, silver or triloweralkylammonium; with a halide of the formula:

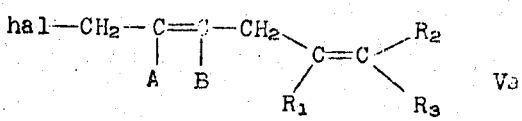   Va or $$hal-CH_2-C \equiv C-CH_2-C \equiv CH$$   Vb wherein $R_1$, $R_2$, $R_3$, A and B are as above and hal is a halogen.

DETAILED DESCRIPTION OF THE INVENTION

The term "lower alkyl", as used throughout this application, comprehends both straight-chain and branched-chain saturated alkyl hydrocarbon groups containing from 1 to 6 carbon atoms such as methyl, ethyl, butyl, and isopropyl, with methyl being preferred.

The term "halogen" or "halo", as used herein, when not expressly stated otherwise, includes all four halogens, i.e., bromine, chlorine, fluorine and iodine, with chlorine being preferred.

The term "alkali metal", as used herein, comprehends the alkali metals of the first group of the periodic chart, such as sodium, potassium and lithium, with sodium being preferred.

The term "triloweralkylammonium", as used herein, means the cation of the reaction salt of a carboxylic acid and a triloweralkylamine. By "triloweralkylamine", as just used, is meant that each of the three alkyl groups attached to the amine nitrogen is a "lower alkyl", as defined above. The term "triloweralkylammonium" includes cations such as triethylammonium and tri-isopropylammonium.

As mentioned above, the esters provided by this invention are useful as insecticides. They are active against a variety of insects (particularly against *Musca domestica*). Furthermore, these esters have been found to have a very low mammalian toxicity. For example, 5,6-dimethyl-hept-5-en-2-ynyl-2,2,3,3-tetramethylcyclopropane carboxylate has an $LD_{50}$ of 1600 mg/kg per os in mice and hexa-2,5-diynyl-2,2,3,3-tetramethylcyclopropane carboxylate has an $LD_{50}$ of 400 mg/kg per os in mice. These esters have shown an activity against *Musca domestica* on the order of that of pyrethrin extract and DDT, and they have also shown activity against bean aphids, colorado beetle and codlin moth.

The esters of the invention can be used in the form of insecticidal compositions which contain them in association with a compatible carrier material. Such insecticidal compositions can be made up in liquid form (e.g. as a sprayable solution or suspension) or in solid form (e.g. as a dust or granulate), either of which includes therewith a compatible carrier. The term "compatible carrier" is used in this specification to mean a substance which is inert towards the esters of formula I, which can be used to dissolve, disperse or diffuse the esters without impairing the effectiveness thereof, and which does not permanently damage the environment to which it is applied (e.g. crops, soil, equipment, etc.). For example, liquid compositions can be extended with water and dusts, and granulates can be extended with inert solid carriers. Where a solid carrier is used in the preparation of insecticidal compositions, the carrier may be talc, finely powdered clay, silica or any similar carrier which does not bring about decomposition of the esters. Where the esters of formula I are formulated into liquid compositions, such compositions can include emulsifiers and/or acceptable organic solvents. If desired, the compositions can also contain conventional additives such as wetting agents or the like, as well as other insecticidally-active compounds and/or synergists.

An effective amount of an insecticidal composition can be applied to an insect-infested area using any conventionally accepted method such as spraying, dusting, etc. Desirably, solid compositions and liquid compositions contain from about 0.5% to 25% (preferably from about 1% to 10%) by weight of an ester of formula I. The choice of concentration of an ester of formula I and the rate of application to the insect-infested area will, of course, depend on several factors; for example, the type and maturity of insects present, the type of composition applied and the mode of application.

It will be appreciated that the insecticidal compositions can take the form of concentrates (e.g. wettable powders or emulsion concentrates) suitable for storage and containing, for example, from about 10% to 80% by weight of an ester of formula I. The concentrates can be diluted with the same or a different carrier to a concentration suitable for application to an insect-infested area. Emulsion concentrates can be prepared, for example, by dissolving an ester of formula I in an acceptable organic solvent and adding an emulsifier which is soluble in the organic solvent.

Any organic solvent can be used including hydrocarbons (e.g. toluene and xylene), chlorinated hydrocarbons (e.g. perchloroethylene), ketones, esters, etc., or mixtures thereof. Preferably, the solvent should be water immiscible and the especially preferred solvents are aromatic hydrocarbons and ketones.

Surfactants are useful as emulsifiers, and when used, they suitably constitute from about 5% to 15% by weight of an emulsion concentrate. Preferably, the surfactants should be non-ionic.

In accordance with this invention, among the preferred compounds of formula I are the following esters:

5-methyl-5-hexen-2-ynyl-2,2,3,3-tetramethyl-cyclopropane carboxylate;

6-methyl-5-hepten-2-ynyl-2,2,3,3-tetramethyl-cyclopropane carboxylate;

5,6-dimethyl-5-hepten-2-ynyl-2,2,3,3-tetramethyl-cyclopropane carboxylate;

cis- and trans-2,5-hexadienyl-2,2,3,3-tetramethyl-cyclopropane carboxylate;

2-trans-2,5-heptadienyl-2,2,3,3-tetramethyl-cyclopropane carboxylate;

trans-5-methyl-2,5-hexadienyl-2,2,3,3-tetramethyl-cyclopropane carboxylate; and 2,5-hexadiynyl-2,2,3,3-tetramethyl-cyclopropane carboxylate.

Among the preferred compounds of formula I, particularly preferred are the ester wherein $R_1$, $R_2$ and $R_3$ are methyl and the ester 2,5-hexadienyl-2,2,3,3-tetramethyl-cyclopropane carboxylate. Among these particularly preferred esters, 5,6-dimethyl-5-hepten-2-ynyl-2,2,3,3-tetramethyl-cyclopropane carboxylate is quite particularly preferred.

The acid halides of formula II are known substances and can be prepared by several well known methods. One method for obtaining this acid halide is by treating tetramethyl ethylene with methyl or ethyl diazoacetic acid ester in the presence of copper powder or anhydrous copper sulfate, using excess tetramethyl-ethylene or toluene as the solvent. In this reaction anhydrous copper sulfate is the preferred reagent, and toluene is the preferred solvent. The resulting carboxylic acid is then halogenated (e.g., using thionyl chloride, phosphorous tri-bromide, or the like).

The acetylenic alcohol starting material of formula IIIa, wherein A and B taken together form a carbon to carbon bond, can be prepared, for example, according to a well known procedure, which includes a Grignard synthesis. In accordance with this procedure, propargyl alcohol is first reacted with a Grignard reagent-loweralkylmagnesium halide. This reaction is conveniently conducted under conventional conditions of temperature, pressure and absence of moisture. The resulting Grignard complex is then treated with cuprous chloride or cuprous cyanide and then with a halide of the formula:

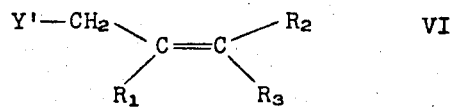

wherein Y' is chlorine or bromine and
$R_1$, $R_2$ and $R_3$ are as above.

In carrying out this reaction, temperature and pressure are not critical, and generally the reaction can be conducted at room temperature (25°C.). The resulting product is then decomposed by treatment with aqueous aluminum chloride to yield the desired acetylenic alcohol of formula IIIa.

The acetylenic alcohol starting material of formula IIIa can also be prepared, according to the method of Kurtz, *Ann.*, 1962, 658, 6–20, by treating an aqueous mixture of propargyl alcohol, cuprous chloride and sodium chloride with aqueous sodium hydroxide and a halide of formula VI.

The acetylenic alcohol starting material of formula IIIa can further be prepared, according to the method of Colonge, *Bull. Soc. Chim. France*, 1957, p. 1166, by treating an acetonic mixture of propargyl alcohol, cuprous chloride and sodium carbonate with a halide of formula VI.

The olefinic alcohol starting materials of formula IIIa, wherein A and B are individually hydrogen, can be prepared, for example, by the reduction of an acetylenic alcohol starting material of formula IIIa, wherein A and B, taken together are hydrogen.

The reduction of an acetylenic alcohol of formula IIIa can be carried out in a well known manner by treating this acetylenic alcohol with an alkali metal aluminum hydride, such as lithium aluminum hydride. This reaction is preferably carried out in the presence of an inert organic solvent. In this reaction, any conventional inert organic solvent may be utilized, the preferred solvent being an ether, particularly diethyl ether. In carrying out this reaction, temperature and pressure are not critical, the preferred temperature being the reflux temperature of the reaction mixture.

The reduction of an acetylenic alcohol of formula IIIa can also be carried out in a well known manner by hydrogenating this acetylenic alcohol in the presence of a partially deactivated palladium catalyst, preferably a palladium catalyst partially deactivated with quinoline. This reaction is preferably carried out in the presence of an inert organic solvent. In this reaction, any conventional inert organic solvent can be utilized, with petroleum ether being preferred. In carrying out this reaction, temperature and pressure are not critical, and the reaction can be conveniently carried out at room temperature (25°C.) and one atmosphere pressure.

In the reduction of the acetylenic alcohol of formula IIIa to the olefinic alcohol of formula IIIa, utilizing an alkali metal aluminum hydride, the resulting olefinic alcohol has a trans configuration in the 2,3-position of the 6 to 12 member aliphatic chain. By comparison, in the reduction formation of the olefinic alcohol of formula IIIc utilizing hydrogenation, the resulting olefinic alcohol has a cis configuration at the 2,3-position of the aliphatic chain.

The alcohol starting materials of formula IIIb can be prepared, for example, according to a well known procedure, which includes a Grignard synthesis. According to this procedure, propargyl alcohol is first reacted with a Grignard reagent-loweralkylmagnesium halide. The resulting Grignard complex is then treated with cuprous chloride or cuprous cyanide and then with propargyl chloride or bromide. The resulting product is then decomposed with aqueous aluminum chloride to yield the desired alcohol of formula IIIb. In carrying out this preparation of the alcohols of formula IIIb, the procedure to be followed is the same as the well known procedures mentioned above regarding the preparation of an acetylenic alcohol of formula IIIa.

The reaction of an acid chloride or bromide starting material of formula II with an alcohol starting material of formula IIIa or IIIb is conveniently carried out in the presence of an acid-binding agent. In this reaction, any conventional acid-binding agent can be used. Among the preferred acid-binding agents are alkali metal carbonates, such as sodium carbonate, alkali metal bicarbonates, such as sodium bicarbonate, and tertiary organic amines, such as triethyl amine, pyridine and the like. An especially preferred acid-binding agent is pyridine. This reaction is conveneintly carried out in the presence of an inert organic solvent. Any conventional inert organic solvent can be used. Among the preferred solvents, are included hydrocarbons, such as benzene, toluene or xylene, ethers, such as diethyl ether or dioxane, and halogenated hydrocarbons, such as methylene chloride or chloroform or the like. In carrying out this reaction, temperature and pressure are not critical, and this reaction can be carried out at room temperature. Generally, it is preferred to carry out this reaction at a temperature within the approximate range of from 0°C. to 30°C., with about 20°C. being especially preferred. The reaction is also preferably carried out under the atmosphere of an inert gas. Any conventional inert gas may suitably be used, with nitrogen or argon being especially preferred.

Another method for preparing the compounds of formula I involves reacting the alkali metal salt, the silver salt or the triloweralkylamine salt of 2,2,3,3-tetramethyl-cyclopropane carboxylic acid of formula IV with the halide of formula Va or Vb.

The alkali metal and triloweralkylamine salts of formula IV can be prepared, for example, by treating 2,2,3,3-tetramethyl-cyclopropane carboxylic acid in an inert organic solvent with a dilute aqueous alkali metal hydroxide solution or a triloweralkylamine. In carrying out this reaction, any conventional inert organic solvent can be utilized which is compatible with the amine or with the hydroxide solution, as the case may be. Among the preferred solvents are the lower alkanols, with ethanol being especially preferred. In carrying out this reaction, any alkali metal hydroxide or triloweralkylamine can be utilized. Among the preferred hydroxides and amines are the sodium and potassium hydroxides and amines and triethylamine. In carrying out this reaction, the temperature and pressure are not critical, and the reaction can be carried out at room temperature.

The silver salts of formula IV can be prepared by treating an alkali metal salt of formula IV, such as the sodium salt, in an aqueous solution with silver nitrate. In carrying out this reaction, the temperature and pressure are not critical, and the reaction can be carried out at room temperature.

The halide starting materials of formula Va or Vb can be prepared, for example, by treating an alcohol starting material of formula IIIa or IIIb with a halogenating agent. Any conventional halogenating agent can be utilized in this reaction, but thionyl chloride and phosphorus tribromide are preferred.

The reaction of an alkali metal salt, a silver salt or a triloweralkylamine salt of a 2,2,3,3-tetramethyl-cyclopropane carboxylic acid, of formula IV, with a halide of formula Va or Vb is suitably carried out in an inert organic solvent. Any familiar inert organic solvent can be used, but it is preferred to use a ketone, such as acetone or methyl ethyl ketone, or a high-boiling ether, such as diglyme, in this reaction. Although temperature and pressure are not critical, the reaction is preferably carried out at an elevated temperature, the reflux temperature of the reaction mixture being especially preferred. It is also preferred to carry out the reaction under the atmosphere of an inert gas. Although the selection of the inert gas is not critical, nitrogen or argon are especially preferred.

It should be noted that the esters of formula I wherein R is a group of formula a can show geometric isomerism. Thus, when said group contains an olefinic and an acetylenic bond, A and B taken together forming a carbon to carbon bond, isomerism can be present in the 5,6-position of the aliphatic chain when $R_2$ and $R_3$ are different. When said group contains two olefinic bonds, A and B individually being hydrogen, isomerism can be present in the 2,3-position, as well as in the 5,6-position when $R_2$ and $R_3$ are different. It will accordingly be understood that the esters provided by this invention include the geometrical isomers as well as mixtures thereof.

The isomer mixtures of the esters of formula I can be separated, if desired, into the all cis or all trans isomers in a conventional manner by, for example, gas chromatography. By this method, the isomer mixture is dissolved in an inert organic solvent, hexane, diethyl ether or acetic acid ethyl ester being preferred solvents, and then adsorbed on Kieselgel. The isomers adsorbed in different zones can be eluted with one of the aforesaid solvents or solvent mixtures and isolated.

The isomer mixtures can, in individual cases, also be separated by fractional distillation methods or possibly also by fractional crystallization methods.

The following examples illustrate the invention. All temperatures are stated in degrees centigrade.

EXAMPLE 1

5.02 g (0.0534 mol) of hexa-2,5-diyn-1-ol was dissolved in 70 ml of dry benzene, and 8.5 ml of dry pyridine was added thereto. The resulting solution was treated dropwise with stirring with crude 2,2,3,3-tetramethyl-cyclopropane carboxylic acid chloride prepared by chlorinating 7.58 g (0.0534 mol) of the corresponding acid in benzene solution over a period of 0.5 hour at 20°C. under a nitrogen atmosphere. The mixture was stirred for 16 hours at 20°C., and the precipitated pyridine hydrochloride was filtered off and washed with benzene. The combined benzene solutions were washed twice with 5-N hydrochloric acid, once with water, twice with 2-N sodium hydroxide solution, twice with 2-N hydrochloric acid, twice with saturated aqueous sodium bicarbonate solution, twice with saturated aqueous sodium chloride solution and then dried over anhydrous sodium sulphate. The sodium sulphate was removed by filtration, and the filtrate was evaporated to a syrup under reduced pressure. On distillation in a high vacuum, this syrup yielded 7.3 g of hexa-2,5-diynyl-2,2,3,3 -tetramethyl-cyclopropane carboxylate as a straw-colored liquid of boiling point 72°–76°C/$10^{-4}$ mmHg; $n_D^{20} = 1.4902$.

EXAMPLE 2

5.1 g (0.037 mol) of 5,6-dimethyl-hept-5-en-2-yl-1-ol was dissolved in 50 ml of dry benzene, and 6 ml of dry pyridine was added thereto. The resulting solution was treated dropwise with stirring with crude 2,2,3,3-tetramethyl-cyclopropane carboxylic acid chloride prepared by chlorinating 5.3 g (0.037 mol) of the corresponding acid in 40 ml of benzene over a period of 0.5 hour at 20°C. in a nitrogen atmosphere. The stirring was continued for 16 hours at 20°C. and the precipitated pyridine hydrochloride was then filtered off and washed with benzene. The combined benzene solutions were washed and dried in the same manner as described in Example 1. Evaporation of the benzene solution yielded a crude syrup which was distilled in a high vacuum to yield 5,6-dimethyl-hept-5-en-2-ynyl-2,2,3,3-tetramethyl-cyclopropane carboxylate as a colorless liquid of boiling point 90°–95°C/$2\times10^{-5}$ mmHg; $n_D^{20} = 1.4882$.

EXAMPLE 3

5.6 g (0.05 mol) of hept-5-en-2-yn-1-ol was dissolved in 80 ml of dry benzene, and 8 ml of dry pyridine was added thereto. The resulting solution was treated dropwise under a nitrogen atmosphere with a solution of 2,-2,3,3-tetramethyl-cyclopropane carboxylic acid chloride, prepared by chlorinating 7.1 g (0.05 mol) of the corresponding acid with thionyl chloride, in 20 ml of dry benzene. An exothermic reaction occurred, and pyridine hydrochloride was precipitated. The resulting mixture was stirred at 20°C. for 14 hours, and the precipitated pyridine hydrochloride was filtered off and washed with benzene. The combined benzene solutions were successively washed twice with 5-N hydrochloric acid, once with water, twice with 2-N sodium hydroxide solution, twice with 2-N hdyrochloric acid, twice with saturated aqueous sodium bicarbonate solution and twice with saturated aqueous sodium chloride solution, dried over anhydrous sodium sulphate, filtered and evaporated to a syrup under reduced pressure. On distillation in vacuo in the presence of hydroquinone, this syrup yielded 9 g of hept-5-en-2 -ynyl-2,2,3,3-tetramethyl-cyclopropane carboxylate of boiling point 102°–104°C/0.4 mmHg; $n_D^{20} = 1.4815$.

EXAMPLE 4

7.1 g (0.05 mol) of 2,2,3,3-tetramethyl-cyclopropane carboxylic acid was treated with thionyl chloride in solution in petroleum ether (boiling range = 40° – 60°C.) and a trace of N,N-dimethyl-formamide. After removal of the petroleum ether by evaporation, the residual acid chloride was dried to constant weight by codistilling with benzene and then was dissolved in 20 ml of benzene. The resulting solution 2,2,3,3-tetramethyl-cyclopropane carboxylic acid chloride was added dropwise to a solution of 5.5 g of hepta-2-trans,5-cis/trans-dien-1-ol and 8 ml of dry pyridine in 80 ml of benzene. The resulting mixture was stirred under a nitrogen atmosphere for 16 hours, and then the precipitate which had formed was washed with benzene. The combined benzene solutions were successively washed once with 5-N hydrochloric acid, once with saturated aqueous sodium chloride solution, twice with 2-N sodium hyroxide solution, once with 2-N hydrochloric acid, once with saturated aqueous sodium bicarbonate solution and twice with saturated aqueous sodium chloride solution, dried over anhydrous sodium sulphate, filtered and evaporated under reduced pressure. Distillation in vacuo yielded 2 g of pure hepta-2-trans,5-cis/trans-dienyl-2,2,3,3-tetramethyl-cyclopropane carboxylate of boiling point 106° –112°C10.065 mmHg; $n_D^{20} = 1.4755$.

EXAMPLE 5

A solution of 7.1 g (0.05 mol) of 2,2,3,3-tetramethyl-cyclopropane carboxylic acid in 100 ml of ethanol was titrated with 2-N sodium hydroxide solution until it gave a neutral reaction. The solution was then evaporated to dryness, and the residue was codistilled twice with ethanol and twice with benzene to yield sodium 2,2,3,3-tetramethyl-cyclopropane carboxylate as a white powder. This was suspended in 250 ml of diethylene glycol dimethyl ether and the suspension was treated with 8.65 g (0.05 mol) of 1-bromo-5-methyl-hex-5-en-2-yne, stirred at 140°C. (oil-bath temperature) for 6 days under a nitrogen atmosphere, and evaporated under reduced pressure. The residue was partitioned between 2-N sodium hydroxide solution and diethyl ether. The ether layer was separated off, successively washed once with 2-N sodium hydroxide solution, once with saturated aqueous sodium bicarbonate solution, twice with water and twice with saturated aqueous sodium chloride solution, dried over anhydrous sodium sulphate, filtered and evaporated to a syrup under reduced pressure. On distillation in vacuo, this syrup yielded 4 g of 5-methyl-hex-5-en-2-ynyl-2,2,3,3-tetramethyl-cyclopropane carboxylate of boiling point 112° – 114°C/1.0 mmHg; $n_D^{20} = 1.4740$.

The following Examples illustrate inseciticidal compositions containing the ester of the invention.

EXAMPLE 6

2.5 g of 5,6-dimethyl-hept-5-en-2-ynyl-2,2,3,3-tetramethyl-cyclopropane carboxylate was dissolved in sufficient kerosene to give a final volume of 100 ml. This solution was suitable for use as a spray.

EXAMPLE 7

5 g of hexa-2,5-diynyl-2,2,3,3-tetramethyl-cyclopropane carboxylate was intimately admixed with 5 g of lignin sulphonate and 90 g of kaolin. The mixture was stirred in a mortar while 10 ml of water was added. The moist mass was further stirred and then granulated. After drying in air there were obtained granules containing 5% of active ingredient.

EXAMPLE 8

20 g of 5,6-dimethyl-hept-5-en-2-ynyl-2,2,3,3-tetramethyl-cyclopropane carboxylate was thoroughly mixed with 10 g of nonoxylon-15 (a non-ionic surfactant) and 70 g of xylene to give a solution usable as an emulsifiable concentrate. Prior to use, the concentrate was emulsified with sufficient water to give a ten-fold dilution.

We claim:

1. A compound of the formula:

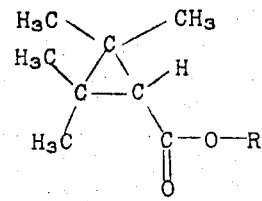

wherein R is a group of the formula:

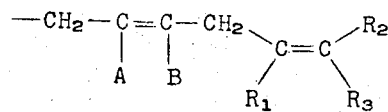

or

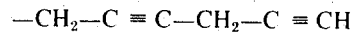

$R_1$, $R_2$ and $R_3$ are hydrogen or lower alkyl; and A and B individually are hydrogen or A and B taken together form a carbon to carbon bond.

2. The compound of claim 1 wherein said compound is hexa-2,5-diynyl-2,2,3,3-tetramethyl-cyclopropane carboxylate.

3. The compound of claim 1 wherein R is

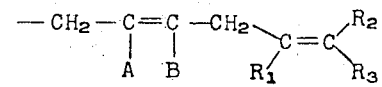

wherein $R_1$, $R_2$, $R_3$, A and B are as above.

4. The compound of claim 3 wherein A and B taken together are a carbon to carbon bond.

5. The compound of claim 4 wherein said compound is 5,6-dimethyl-5-hepten-2-ynyl-2,2,3,3-tetramethyl-cyclopropane carboxylate.

6. The compound of claim 3 wherein A and B are individually hydrogen.

7. The compound of claim 6 wherein said compound is 2-trans-2,5-heptadienyl-2,2,3,3-tetramethyl-cyclopropane carboxylate.

* * * * *